3,121,116
PROPYNYL p-PHENYLENE DIAMINES
Chester E. Pawloski, Bay City, Mich., assignor to The Dow Chemical Company, Midland, Mich., a corporation of Delaware
No Drawing. Filed Mar. 31, 1961, Ser. No. 99,729
3 Claims. (Cl. 260—577)

This invention is directed to propynyl p-phenylene diamines corresponding to the formula

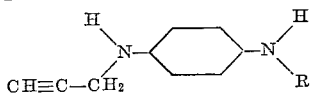

wherein R represents hydrogen or (2-propynyl). These compounds are liquid and crystalline materials which are somewhat soluble in many common organic solvents and of very low solubility in water. They are useful as parasiticides, nematocides and herbicides for the control of the growth and the killing of a number of plant, insect, and bacterial organisms such as nematodes, Cabomba and *Bacillus subtilis*.

The new propynyl p-phenylene diamines are prepared by reacting propargyl bromide or propargyl chloride with p-phenylene diamine. The reaction is carried out in a liquid reaction medium such as diethyl ether, acetone, benzene or heptane, and in the presence of a halide acceptor which conveniently is a basic material such as an alkali metal carbonate. The reaction takes place smoothly at the temperature range of from about 35°–100° C. with the production of the desired product and halide of reaction. This halide appears in the reaction mixture as the salt of the metal in the employed base. Good results are obtained when reacting about one molecular proportion of p-phenylene diamine with about one molecular proportion of propargyl halide in the presence of about one molecular proportion of the halide acceptor. Where optimum yields of N-(2-propynyl) p-phenylene diamine are desired, it is preferred to employ substantially equimolecular proportions of the reactants. For optimum yields of N,N'-di(2-propynyl) p-phenylene diamine, at least two molecular proportions of propargyl halide are employed with one molecular proportion of p-phenylene diamine. In such preferred operations, the halide acceptor is employed in an amount substantially equimolecular with the employed amount of propargyl halide. Upon completion of the reaction, the desired product may be separated and purified by conventional procedures.

In carrying out the reaction, the propargyl halide, p-phenylene diamine and halide acceptor are mixed and contacted together in the reaction medium and the resulting mixture maintained for a period of time with stirring at a temperature of from 35° to 100° C to insure completion of the reaction. The reaction mixture conveniently is then washed with water and low boiling constituents removed by fractional distillation under reduced pressure to obtain the desired product as a residue.

In a representative operation, p-phenylene diamine (108 grams; one mole), and 280 grams (two moles) of potassium carbonate were dispersed in 500 milliliters of acetone and the mixture brought to the boiling temperature, 240 grams (two moles) of propargyl bromide was added portion wise to the above warmed mixture with stirring and over a period of three hours. Stirring was thereafter continued and the reaction mixture maintained at the boiling temperature and under reflux for 21 hours to complete the reaction. The mixture was thereafter washed with water and low boiling constituents removed by fractional distillation under reduced pressure. Upon standing, the concentrated mixture separated into a solid portion and a liquid portion. The portions were separated to obtain an N,N'-di(2-propynyl) p-phenylene diamine product as a crystalline solid melting at 114°–116° C., and an N-(2-propynyl) p-phenylene diamine product as a liquid residue having a refractive index $n_D$ of 1.5910 at 25° C.

The novel products of the present invention are useful as herbicides, nematocides and parasiticides for the control of the growth and killing of a number of plant and parasite species. For such uses, the products are dispersed on an inert finely divided solid and employed as dusts. Such mixtures also may be dispersed in water with or without the aid of a surface active agent, and employed as sprays. In other procedures, the products are employed as active constituents in solvent solutions, oil-in-water or water-in-oil emulsions, or aqueous dispersions. In representative operations, aqueous compositions containing 25 parts per million by weight of N-(2-propynyl) p-phenylene diamine give 100 percent controls of root knot nematodes. In other operations, N-(2-propynyl) p-phenylene diamine gives 100 percent controls of the growth of *Bacillus subtilis* at concentrations of 500 parts per million by weight.

I claim:
1. A compound selected from the group consisting of N-(2-propynyl) p-phenylene diamine and N,N'-di(2-propynyl) p-phenylene diamine.
2. N-(2-propynyl) p-phenylene diamine.
3. N,N'-di(2-propynyl) p-phenylene diamine.

References Cited in the file of this patent

Wolf, Justus Liebigs Annalen der Chemie, 1952, Band 576, page 36.